United States Patent
Newell

(10) Patent No.: US 8,595,120 B1
(45) Date of Patent: Nov. 26, 2013

(54) MARKET ON CLOSE SYSTEM, METHOD AND PROGRAM PRODUCT

(75) Inventor: Michael Adam Newell, Slough (GB)

(73) Assignee: BATS Global Markets, Inc., Lenexa, KS (US)

( * ) Notice: Subject to any disclaimer, the term of this patent is extended or adjusted under 35 U.S.C. 154(b) by 105 days.

(21) Appl. No.: 12/893,859

(22) Filed: Sep. 29, 2010

Related U.S. Application Data

(60) Provisional application No. 61/247,833, filed on Oct. 1, 2009.

(51) Int. Cl.
*G06Q 40/00* (2012.01)

(52) U.S. Cl.
USPC .................................................. 705/37

(58) Field of Classification Search
USPC .................................................. 705/37
See application file for complete search history.

(56) References Cited

U.S. PATENT DOCUMENTS

| | | | |
|---|---|---|---|
| 2004/0111358 A1* | 6/2004 | Lange et al. | 705/37 |
| 2004/0230512 A1* | 11/2004 | Gulati | 705/36 |
| 2006/0253375 A1* | 11/2006 | Adcock et al. | 705/37 |
| 2007/0208654 A1* | 9/2007 | Stearns | 705/37 |
| 2008/0275808 A1* | 11/2008 | Mackay | 705/37 |

OTHER PUBLICATIONS

NYSE (http://web.archive.org/web/20080614083108/http://www.nyse.com/equities/nysearcaequities/1157623605155.html).*
Euronext, Trading at Last Phase Functional Memento; Jan. 31, 2001; pp. 1-8.
BATS, Market on Close, Sep. 2009; 2 pages.
McEachern Gibbs, Cristina; Instinet Europe's BlockMatch Launches Closing Cross; Jun. 10, 2009; http://www.advancedtrading.com/showArticle.jhtml?articleID=217800552; 1 page.
BATS Europe Market on Close Specification, Version 1.2; Jul. 22, 2009; pp. 1-14.

\* cited by examiner

*Primary Examiner* — Narayanswamy Subramanian
*Assistant Examiner* — Asha Puttaiah
(74) *Attorney, Agent, or Firm* — Foley & Lardner LLP

(57) ABSTRACT

A system and method for providing a market on-close operation for a market is provided. Buy orders and sell orders for tradeable assets are obtained. A time of market close is obtained. A respective buy order is matched to a respective sell order, but without a price. The respective order quantity match is locked-in without a price. A close price for the tradeable asset in the given primary market is obtained and the quantity match is executed. A fill message is transmitted to the respective buyer and the respective seller with the quantity matched and the close price for the tradeable asset.

44 Claims, 5 Drawing Sheets

MARKET ON CLOSE SYSTEM, METHOD AND PROGRAM PRODUCT

CROSS-REFERENCE TO RELATED PATENT APPLICATIONS

This application claims priority to Provisional Application U.S. Application 61/247,833 filed Oct. 1, 2009, which application is hereby incorporated by reference in its entirety as if fully set forth herein.

BACKGROUND

The following description is provided simply as an aid in understanding the disclosure and is not admitted to describe or constitute prior art. The present invention relates generally to primary auctions and a market on close (MOC) period during the primary auction before a close price is set. A primary auction matches buy and sell orders at a price (e.g., the close price) that maximizes the amount of tradeable stock. Several markets across the world implement some form of primary auction.

SUMMARY

According to one embodiment, a system for providing a market on-close operation for a given primary market, comprises one or more computers, configured with the following components: an electronic network communication component for transmitting and receiving electronic communications over one or more electronic networks; a component configured in the one or more computers for receiving on the one or more computers buy orders and sell orders for tradeable assets listed on the given primary market, with each of a plurality of the orders including a quantity parameter, but not a required price; a component configured in the one or more computers for determining a time of market close of the given primary market; a component configured in the one or more computers for matching, in whole or in part, a respective buy order to a respective sell order for a given one of the tradeable assets to obtain a respective partial or whole quantity match order only during market on close (MOC) period between the market close and before a close price is obtained for the given primary market for the given tradeable asset, the component for matching further comprising a component for locking-in, before the close price for the given tradeable asset is obtained for the given primary market, the respective quantity match order without a price for the given tradeable asset, so that the respective buyer or seller cannot cancel a portion of their respective order that comprises the quantity match order after this lock-in; a component configured in the one or more computers for transmitting or posting via the electronic network communication component a message to the respective buyer and/or to the respective seller that part or all of their respective order has been matched and is locked-in; a component configured in the one or more computers for obtaining via the electronic network communication component the close price for the given tradeable asset in the given primary market; a component configured in the one or more computers for sending one or more electronic communications to cause execution of the quantity match order after receiving the close price for the given tradeable asset; a component configured in the one or more computers for transmitting or posting via the electronic network communication component a fill message to the respective buyer and the respective seller with the quantity matched and the close price for the tradeable asset; and a component configured in the one or more computers for accessing an electronic database, configured to store: the received buy orders and sell orders for the tradeable assets; and the close price for the given tradeable asset.

According to a further embodiment, the one or more computers are configured during the market on close (MOC) period, to prevent matching by the system of a buy order to a sell order that do not both have an MOC order indicator.

According to another embodiment, the one or more computers are configured during the market on close (MOC) period, to prevent matching by the system of an order that includes data indicating a share price requirement.

According to another embodiment, the one or more computers are configured during the market on close (MOC) period, to prevent acceptance into the system of a buy order or a sell order without an MOC order indicator.

According to another embodiment, the one or more computers are configured during the market on close (MOC) period, to remove from the system at the market close all orders without an MOC order indicator.

According to yet another embodiment, the buy orders with an MOC order indicator and sell orders with an MOC order indicator are received throughout a trading period before the market close, but are not matched until the primary market auction period after the market close and before the close price is obtained.

According to still another embodiment, the system for providing a market on-close operation for a market further comprises a component configured in the one or more computers for sending one or more electronic communications to return one or more residuals of buy orders or sell orders, if any, for one or more tradeable assets, which residual was not matched by the component for matching.

According to one embodiment, the component for sending one or more electronic communications to return one or more residuals is configured to initiate the one or more of the electronic communications either automatically or after receipt of an electronic communication from an originator of the respective buy order or sell order.

According to another embodiment, the component for matching is configured to match buy orders and sell orders in a time priority.

According to yet another embodiment, the component for sending one or more electronic communications to cause execution of the sale of the quantity match is configured to send the one or more electronic communications after the close price is published.

According to still another embodiment, the system is further configured with one or more components: to receive additional buy orders and sell orders after the close price is published; to match, in whole or in part, one respective buy order to one respective sell order to obtain a respective partial or whole quantity match order, wherein at least one of the buy order and the sell order is an additional order; and to send one or more electronic communications to cause execution of the quantity match order associated with the at least one additional order at the close price.

According to one embodiment, the system for providing a market on-close operation for a market further comprises a component configured in the one or more computers for modifying or cancelling one of the buy orders or one of the sell orders based on an electronic communication received before a respective partial or whole quantity match order for that respective buy order or respective sell order is locked in.

According to still another embodiment, the component for transmitting or posting a message that all or part of the respective order has been matched and is locked-in comprises a component configured in the one or more computers to execute push software for transmitting a message concerning a locked-in quantity for the respective buy and/or sell order.

According to one embodiment, the transmission of the message of the locked-in quantity is triggered by a change in a locked-in quantity indicator in a data structure for the respective buy or sell order.

According to another embodiment, the quantity match order is not published and is maintained confidential.

According to one embodiment, the buy orders and sell orders for tradeable assets listed on the given primary market and the quantity match orders are not published and are maintained confidential.

According to one embodiment, the component to receive is configured to receive buy orders and sell orders listed on a plurality of different primary markets, and wherein the component for matching is configured to only match buy orders to sell orders listed on the same primary market.

In a further embodiment, the component for transmitting or posting via a message to the respective buyer and/or to the respective seller that part or all of their respective order has been matched and is locked-in is configured to only trigger the transmitting or posting when a communication is received from the respective buyer or the respective seller requesting to modify or cancel their respective order.

In a yet further embodiment, the component for transmitting or posting via a message to the respective buyer and/or to the respective seller that part or all of their respective order has been matched and is locked-in is configured to trigger the transmitting or posting of the message as soon as the lock-in occurs.

According to one embodiment, a method for providing a market on-close operation for a given primary market, comprises the steps of receiving buy orders and sell orders for tradeable assets listed on the given primary market, with each of a plurality of the orders including a quantity parameter, but not a required price; determining, by one or more computers, a time of market close of a given primary market; matching, by the one or more computers, in whole or in part, a respective buy order to a respective sell order for a given one of the tradeable assets to obtain a respective partial or whole quantity match order only during a market on close (MOC) period between a market close and before a close price is obtained for the given primary market for the given tradeable asset; locking-in, by the one or more computers, before the close price for the given tradeable asset is obtained, the respective quantity match order without a price for the given tradeable asset, so that the respective buyer or seller cannot cancel a portion of their respective order that comprises the quantity match order after this lock-in; transmitting or posting, via the one or more electronic networks and the one or more computers, a message to the respective buyer and/or to the respective seller that part or all of their respective order has been matched and is locked-in, at least when one of the buyer or the seller attempts to modify or cancel their respective order; obtaining, via the one or more electronic networks, a close price for the tradeable asset in the given primary market; sending, by the one or more computers, one or more electronic communications to cause execution of the quantity match order after receiving the close price for the given tradeable asset; and transmitting or posting via the one or more electronic networks and the one or more computers, a fill message to the respective buyer and the respective seller with the quantity matched and the close price for the tradeable asset.

According to a further embodiment, the method comprises preventing, by the one or more computers during the market on close (MOC) period, matching by the system of a buy order to a sell order that do not both have an MOC order indicator.

According to a further embodiment, the method comprises preventing, by the one or more computers during the market on close (MOC) period, matching by the system of an order that includes data indicating a share price requirement.

According to a further embodiment, the method comprises preventing, by the one or more computers during the market on close (MOC) period, acceptance into the system of a buy order or a sell order without an MOC order indicator.

According to a further embodiment, the method comprises removing, by the one or more computers for the market on close (MOC) period all orders without an MOC order indicator.

According to a further embodiment, the method comprises preventing, by the one or more computers during the market on close (MOC) period acceptance into the system of a buy order or a sell order that includes data indicating a share price requirement.

According to yet another embodiment, the method is configured so that the buy orders with an MOC order indicator and sell orders with an MOC order indicator are received throughout a trading period before the market close, but are not matched until the primary market auction period after the market close and before the close price is obtained.

According to still another embodiment, the method further comprises sending one or more electronic communications to return one or more residuals of buy orders or sell orders, if any, for one or more tradeable assets, which respective residual was not matched.

According to one embodiment, the method is configured so that the one or more electronic communications to return one or more of the residuals are initiated either automatically or after receipt of an electronic communication from an originator of the respective buy order or sell order.

According to another embodiment, the method comprises the matching step matching buy orders and sell orders in a time priority.

According to yet another embodiment, the method comprises the one or more electronic communications being sent after the close price is published.

According to still another embodiment, the method further comprises receiving additional buy orders and sell orders after the close price is published; matching, in whole or in part, one respective buy order to one respective sell order to obtain a respective partial or whole quantity match order, wherein at least one of the buy order and the sell order is an additional order; and sending one or more electronic communications to cause execution of the quantity match order associated with the additional order at the close price.

According to one embodiment, the method further comprises modifying or cancelling one of the buy orders or one of the sell orders based on an electronic communication received before a respective partial or whole quantity match order for that respective buy order or respective sell order is locked in.

According to another embodiment, the method is configured to receive one or more of the buy orders and sell orders with a data structure that comprises a parameter specifying a length of time parameter the respective buy order or respective sell order is in force and can be matched, and wherein the matching step matches only buy orders and sell orders where neither order has a length of time parameter, if specified, that has lapsed.

According to still another embodiment, the method for providing a market on-close operation for a market further comprises executing push software for transmitting a message concerning a locked-in quantity for the respective buy and/or sell order.

According to one embodiment, the method further comprises triggering the transmission of the message of the locked-in quantity based on a change in a locked-in quantity indicator in a data structure for the respective buy and/or sell order.

According to another embodiment, the method comprises the quantity match order is not being published and being maintained confidential.

According to one embodiment, the method comprises the buy orders and sell orders for tradeable assets being listed on the given primary market and the quantity match order not being published and being maintained confidential.

According to one embodiment, the receiving step is receiving buy orders and sell orders listed on a plurality of different primary markets, and wherein the matching step matches only buy orders to sell orders having the same primary market.

According to one embodiment, a program product is disclosed comprising a computer-readable medium having computer-executable instructions embodied therein, to be executed by a computer, for performing a method comprising: receiving, over one or more electronic networks and by one or more computers, buy orders and sell orders for tradeable assets listed on a given primary market, with each of a plurality of the orders including a quantity parameter, but not a required price; determining, by the one or more computers, a time of market close of the given primary market; matching, by the one or more computers, in whole or in part, a respective buy order to a respective sell order for a given one of the tradeable assets to obtain a respective partial or whole quantity match order only during a market on close (MOC) period between a market close and before a close price is obtained for the given primary market for the given tradeable asset; locking-in, by the one or more computers, before the close price for the given tradeable asset is obtained, the respective quantity match order without a price for the given tradeable asset, so that the respective buyer or seller cannot cancel a portion of their respective order that comprises the quantity match order after this lock-in; transmitting or posting, via the one or more electronic networks and the one or more computers, a message to the respective buyer and/or to the respective seller that part or all of their respective order has been matched and is locked-in, at least when one of the buyer or the seller attempts to modify or cancel their respective order; obtaining, via the one or more electronic networks, a close price for the tradeable asset in the given primary market; sending, by the one or more computers, one or more electronic communications to cause execution of the quantity match after receiving the close price for the given tradeable asset; and transmitting or posting via the one or more electronic networks and the one or more computers, a fill message to the respective buyer and the respective seller with the quantity matched and the close price for the tradeable asset

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION

Embodiments of the disclosure will be described below with reference to the accompanying drawings. It should be understood that the following description is intended to describe exemplary embodiments, and not to limit the claimed subject matter.

Figure 1:
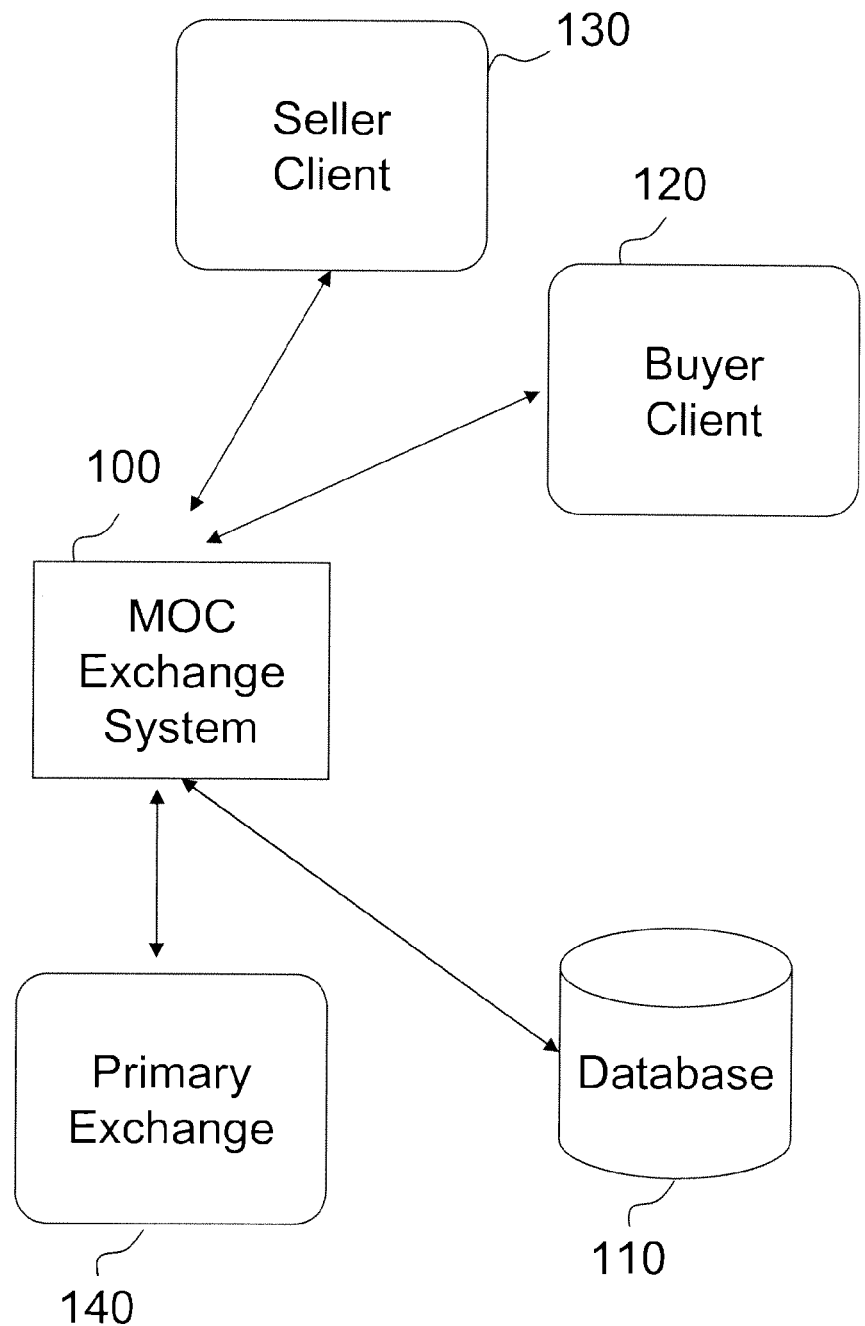
FIG. 1 is a schematic block diagram of one embodiment.

FIG. 1 is a block diagram showing a market-on-close system (MES) 100 for managing a market-on-close operation. According to one embodiment, the market-on-close system facilitates the buying and selling of securities at or near the end of the trading time of a primary market such as, for example, a primary exchange for a set of securities. Primary markets are facilitated by underwriting groups, which may comprise investment banks, for example, that will set a beginning price range for a given security and then oversee its sale directly to investors. After the initial sale is complete, further trading is said to conduct on the secondary market, which is where the bulk of market trading occurs each day.

The MES 100 may comprise a computer implemented system and is operably connected to a database 110. According to one embodiment, the MES 100 is connected via an electronic communication network to a buyer client 120, a seller client 130 and a primary market 140. As noted, the primary market 140 is an organized market for the buying and selling of one or more securities. A buyer client 120 is a computer implemented system for placing buy orders. The seller client 130 is a computer implemented system for placing sell orders. The buyer client 120 and seller client 130 are configured to receive signals (e.g., information, data, etc.) from the MES 100 and provide information to the respective buyer and/or seller in a perceptible format (e.g., via a display screen, audibly, in print, etc.). Note that a system can be a buyer client for some securities, and a seller client for other securities.

Figure 3:
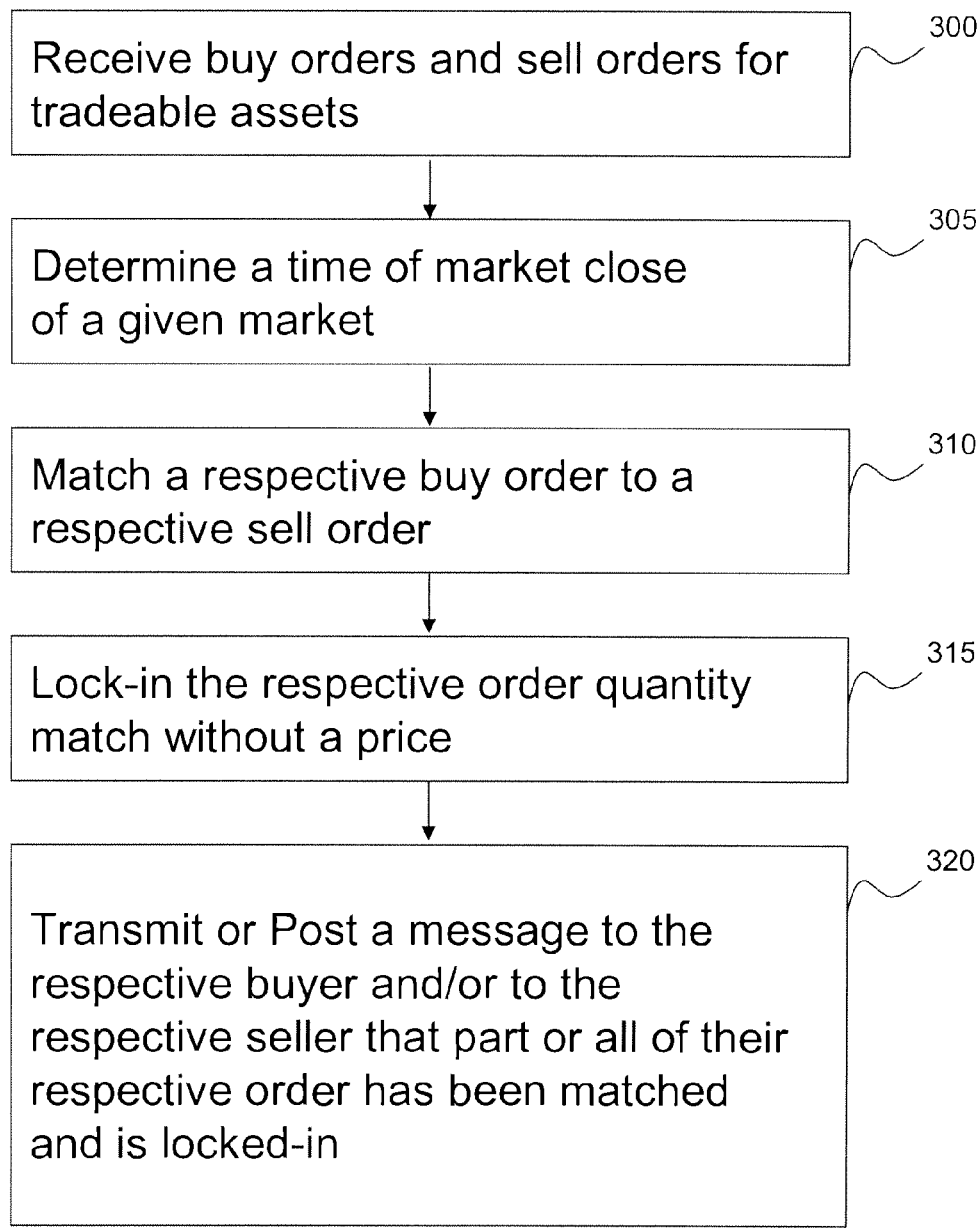
FIG. 3 is a flow chart for implementing one or more embodiments.
Figure 4:
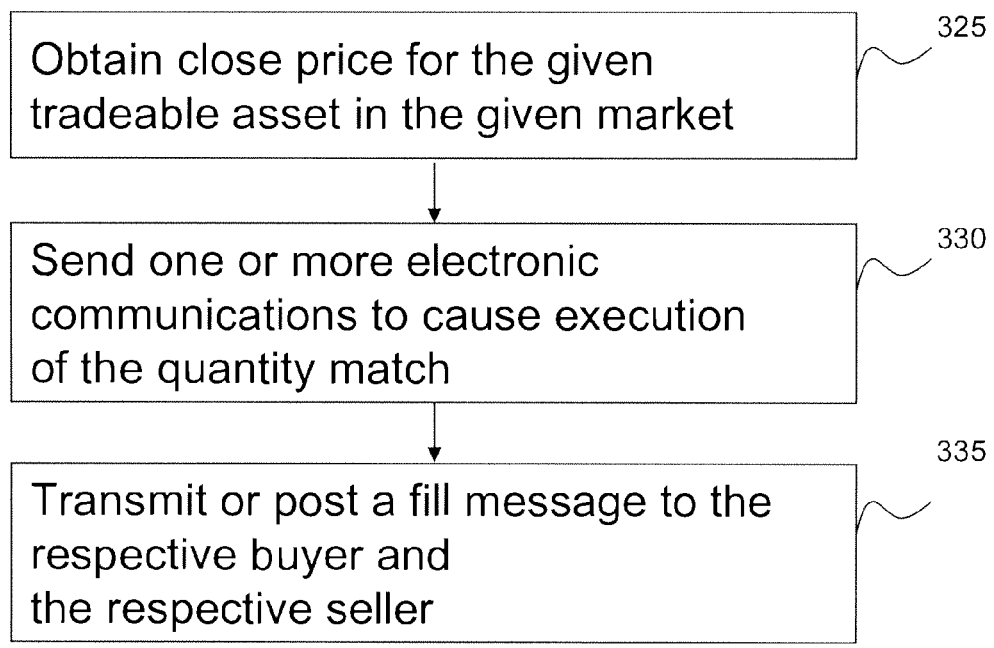
FIG. 4 is a flow chart for implementing one or more embodiments.
Figure 5:
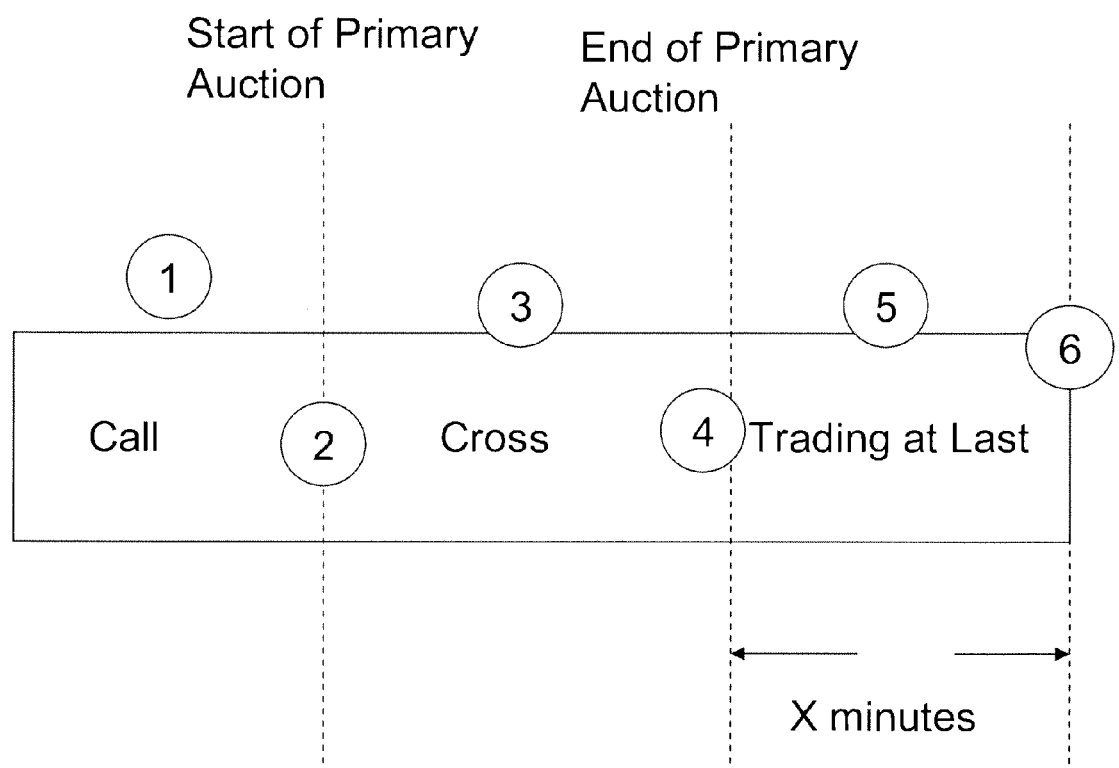
FIG. 5 is an exemplary timeline for implementing one or more embodiments.

One embodiment of a method for providing a market on-close operation for a market is shown in FIGS. 3 and 4. In addition, an exemplary timeline for a market on-close operation is shown in FIG. 5. According to the embodiment, the method is carried out by one or more computers in conjunction with an electronic network communication component that facilitates the transmission and reception of electronic communications over one or more electronic networks (to be described below).

Referring to FIG. 3, in one embodiment, the market on-close system and operation receives into the MES system 100 throughout the trading day until an official close price for the tradeable asset is published or is set by the primary market, buy orders with a market on close (MOC) indicator (which may be an MOC tag, or may simply be received at a particular network address, or may have some other indicator for market on close) for tradeable assets that are listed on a primary market, and sell orders with a market on close (MOC) indicator for tradeable assets that are listed on the primary market, which orders are then matched only during an auction period after the market close until the official close price of the given primary market for the tradeable asset is published or set. In another embodiment, the market on-close system and operation only receives into the MES system 100 MOC buy and sell orders beginning at the market close for the primary market for the tradeable assets until an official close price for the tradeable asset is published or set by the primary market, e.g., a primary exchange auction. These orders are matched only during this primary market auction period after the market close until the official close price of the given primary market for the tradeable asset is published or set. This receiving operation is referenced as step 300 in FIG. 3. In one embodiment, the buy orders and sell orders are received over the one or more electronic networks and the one or more computers. In another embodiment, the buy and/or sell orders are received by facsimile, and/or by telephone, and/or by mail, and then keyed into the system. Accordingly, the operation of receiving the buy and sell orders into the one or more computers may be accomplished as the result of a keying operation. The method of receiving the buy and sell orders is not limiting on the invention. Note that the buy orders and sell orders will indicate a share quantity but do not indicate a required share price or price minimum or price maximum.

According to one embodiment, the receiving component is configured in the one or more computers for receiving buy orders and sell orders listed on different primary markets. In this embodiment, the component for matching (to be discussed below), is configured to only match buy orders to sell orders having a same primary market.

As noted, in one embodiment buy orders without a required price and with a market on close (MOC) tag or other indicator and sell orders without a required price and with a market on close (MOC) tag or other indicator may be received throughout a predetermined period of time, e.g., a trading day, and a hold placed on the order (the order is "parked") until the market on close period, beginning at the market close. As indicated in FIG. 5, this period of time, is identified by circle 1, and may be referred to as the call period. According to this embodiment, orders are received with no price restrictions and with MOC tags or other indicators but are not matched and locked until the market on close period beginning at a start of a primary market auction, identified in FIG. 5 by circle 2. According to one embodiment, a subset of the FIX 4.2 protocol (described later) is used for order entry into the system 100.

In step 305, a computer implemented operation determines a time of market close of the given primary market. As shown in FIG. 5, this point in time is identified by circle 2, which is the beginning of the primary auction in the primary market and is the beginning of a Cross period identified by circle 3. This determination may be accomplished via information obtained from an electronic network, or by accessing a database or a website, or by receiving a facsimile or by telephone, and then keyed to the system, to name a few. The method of obtaining this information is not limiting on the invention.

In step 310 during the Cross period during the primary auction represented by circle 3 in FIG. 5, a computer implemented operation matches, in whole or in part, a respective buy order to a respective sell order for a given one of the tradeable assets to obtain a respective partial or whole quantity match order without a price only during a primary auction of the given primary market, e.g., between a market close and before a close price is obtained (e.g., published or received or accessed) for the given primary market for the given tradeable asset. Note that the language "partial or whole quantity match" means that a given buy order can be matched to one sell order or to portions of multiple different sell orders, and a given sell order can be matched to one buy order or to portions of multiple different buy orders. According to one embodiment, the matching is configured to match buy orders and sell orders in a time priority, e.g., a priority set by the time of receipt of a buy order and/or sell order.

In step 315, a computer implemented operation locks-in, before the close price for the given tradeable asset is obtained by the given primary market, the respective quantity match order without a price, so that the respective buyer or seller cannot cancel a portion of their respective order that comprises the quantity match order after this lock-in. Lock-in, in one embodiment, may be implemented by using "false" execution messages. For example, lock-in may be implemented by executing at a dummy price, e.g., 1 penny, and then revising the order when the real price is known. Note that steps 310 and 315 may be implemented in a single computer operation or in separate operations.

Note that in a normal market, buy and sell orders limited or not limited in price are received and matched throughout the day. For example, a buy order might be received to buy security A at a price up to 110. If a sell order is received to sell security A at a price of 109 or more, then there is an instant match of the buyer and the seller. Such order matches occur continuously throughout the day. In contrast, the present invention performs matching and lock-in at an undetermined price and only after the market close and before the close price is obtained.

According to one embodiment, the system 100 may be configured with a component to receive modification and/or cancellation requests from a respective buyer and/or seller, and to perform a computer implemented operation modifying or cancelling one of the buy orders or one of the sell orders if the electronic communication is received before a respective order quantity match for that order is locked in. If the order has already been partially locked-in, then only the unlocked portion of the order may be modified or cancelled.

In one embodiment, a further step 320 is also performed comprising a computer implemented operation of transmitting or posting via the electronic network communication component a message to the respective buyer and/or to the respective seller that part or all of their respective order has been matched and is locked-in. This lock-in message describing to the buyer and/or seller what part of their order has been locked may be transmitted or posted as soon as the lock-in occurs. For example, a message may be posted to respective client PDA's on the lock-in of their respective buy and sell orders. In some embodiments, this communication is performed by telephone, or by facsimile, or by mail. In some embodiments, an automatic lock-in communication providing a quantity that is locked-in, is only triggered if the respective buyer client or seller client attempts to modify or cancel their respective order. In some embodiments this step may not be performed.

According to one embodiment, the system 100 may be configured to perform the step 320 with a computer implemented operation to provide substantially real-time updates on paired locked-in order quantities throughout the Cross period 3 shown in FIG. 5. A given substantially real-time update may be triggered by an electronic designation of a lock-in quantity being associated with a respective buy order and a respective sell order. The term "substantially real-time" means that an electronic operation is initiated, that may require one or more accesses to databases and other processing operations before an electronic update communication is transmitted and/or posted. According to one embodiment, the substantially real-time update operation for the quantity of locked shares on an order is facilitated by a specific custom field for the FIX specification called LockedQty being filled in.

In step 325, the close price for the given tradeable asset in the given primary market is obtained. According to one embodiment, this point in time is identified by circle 4 in FIG.

5 as the end of the primary auction. In one embodiment, the close price for the given tradeable asset is received over the one or more electronic networks and the one or more computers or received via access to a website with the close price posted. In another embodiment, the close price is obtained by facsimile and/or by telephone and keyed into the system. the method of obtaining the close price is not limiting on the invention.

In step 330, a computer implemented operation sends one or more electronic communications to cause execution of the quantity match order after receiving the close price for the given tradeable asset. In one embodiment, the step is implemented by sending an electronic message, via one or more electronic networks and the one or more computers, to cause execution of the quantity match after receiving the close price for the given tradeable asset. In one embodiment, the electronic message is sent to a third party clearing system, to be discussed below. According to one embodiment, the one or more electronic communications are sent after the close price is published. Note that other methods may be used to initiate execution of the trade. The method to initiate execution is not limiting on the invention.

According to one embodiment, residuals (remaining after this matching has occurred) on an imbalance side of a trading book may be moved automatically into a Trading At Last period, identified by circle 5 in FIG. 5, unless the respective residual was cancelled by the participant via an explicit order cancel request, or a pre-specified order time for the respective order expires, or the time that the sell or buy order is in force ends at the end of the Cross period shown in FIG. 5. The pre-specified time on an order noted above indicates that an order should expire (be cancelled by the system) at a specified time. If no time is specified, the order will simply persist until the MOC process has finished and the system closes down, or until the client requests to cancel the order.

According to another embodiment, during the Trading At Last period, identified by circle 5 in FIG. 5, a computer implemented method may receive additional buy orders and sell orders after the close price is published, and match, in whole or in part, the additional respective buy orders to respective sell orders, or match these additional orders to residuals that remain in effect, and then send one or more electronic or other communications to cause execution of the quantity match at the close price.

According to one embodiment, residuals may be cancelled during the Trading at Last Period. According to one embodiment, the actual end-time of a Trading at Last period may be determined by publication of an official uncrossing price from the primary market, and may vary on a per primary market and per symbol basis. Alternatively, the end-time of the Trading at Last period may be determined based on one or more other parameters.

In step 335, a computer implemented operation transmits or posts, via the electronic network communication component and the one or more computers, a fill message to the respective buyer and the respective seller with the quantity matched and the close price for the tradeable asset. Note that the fill message may also be communicated via other methods, such as by facsimile or by telephone or by mail. The method of communicating the fill message is not limiting on the invention.

As shown in FIG. 5, circle 6 denotes the end of the primary auction plus a predetermined amount of time for Trading at Last. According to this embodiment, at the time denoted by circle 6 all residuals are cancelled.

In one embodiment, the one or more computers of the MES system 100 may be configured with programming to receive and process buy orders and/or sell orders using the Financial Information eXchange (FIX) Protocol. The FIX protocol is a messaging standard developed specifically for the real-time electronic exchange of securities transactions. FIX is a public-domain specification owned and maintained by FIX Protocol, Ltd. The Financial Information eXchange ("FIX") Protocol is a series of messaging specifications for the electronic communication of trade-related messages. FIX is an open specification around which commercial or open-source software can be created. Accordingly, the system 100 may be configured so that step 300 is implemented in one embodiment, to receive buy orders and sell orders in the FIX protocol.

According to one embodiment, orders placed into the market on-close system 100 and order execution and other operations are implicitly hidden, regardless of whether or not they are classified as Large In Scale (LIS). A LIS value defines a threshold amount at which an order can be hidden in some markets. Hidden orders are not published and/or are maintained confidential. Accordingly, hidden orders do not influence the price of securities on the primary market 140 or any other exchanges. According to one embodiment, the market-on-close system maintains confidential and does not publish received buy orders and sell orders and quantity match order execution, regardless of the size of the order at a closing price.

In one embodiment of the market on-close system and operation, MOC orders only interact with other market on-close orders. In this embodiment, all other order types available on the system, e.g. Limit orders, Iceberg orders, Pegged orders, to name a few, are not operated for the market on close operation. In one embodiment, this limitation to MOC orders is accomplished by deleting all orders from the system that do not have a MOC order "order type" tag. This tag may be in the data structure for the received order, or may be added on receipt by the system to differentiate orders on entry. Before MOC operation begins, all existing orders are removed from the system or otherwise made non-functional for the MOC operation, except for MOC orders entered before the call period (circle 1 in FIG. 5) begins which have been sitting in a "pending" state. After the market on close period (circle 3 in FIG. 5) begins, only MOC orders are allowed/accepted based on their order tag. This operation prevents MOC orders matching with any other order types.

According to one embodiment, quotes for market on-close orders are not represented on any market data feed. But matches in the market on-close system and operation may be represented as trades on an index's market data feeds. According to one embodiment, with reference to the FIX protocol, orders destined for the market on-close system and operation set ExecInst=c or OrdType=5 or B. During the crossing period represented by circle 3 in FIG. 5, cancellation and modification restrictions apply so participants must be able to process Execution Report Restatements (MsgType=8 with ExecType=D). This means that a client cannot cancel or modify an existing locked portion of the order as it would have been previously notified by the restatement message, e.g., a client enters a 10,000 share order and 1 minute in to MOC the system matches 5,000 shares. The system sends the client a restatement indicating that 5,000 shares in this order are locked. The client now knows that if they want to cancel the order, their cancel instruction will only apply for the 5,000 share remaining, and not the 10,000 original.

In one embodiment in relation to step 310, the one or more computers of the MES system 100 may be configured with programming to receive one or more of the buy and/or sell orders having a data structure that comprises a parameter specifying a length of time parameter the respective buy order or respective sell order is in force and can be matched. Accordingly, a computer implemented method matches only buy orders and sell orders where neither the buy or the sell order has a length of time parameter, if specified, that has lapsed. According to this embodiment, the computer implemented method matches buy orders and sell orders in a time priority.

In a further embodiment of step 310 during the primary auction in the Cross period 3, there are provided at least three possibilities for the operation of a market-on-close closing trading book implemented on the one or more computers. Those options are: residual on one side of the trading book for the asset (the "imbalance"), a fully matched trading book for the asset, or an empty trading book for the asset. New orders on the imbalance side of the trading book for the asset add to the imbalance. New orders on the opposite side of the imbalance for the asset offset the imbalance and are immediately locked. According to this embodiment, an order on the opposite side of the imbalance for the asset which is larger than the imbalance will flip the imbalance to the other side of the trading book and lock the previous imbalance for the asset. Buy and sell orders that are not matched are residual orders. At a subsequent time, according to one embodiment, a computer implemented method sends one or more electronic communications to return one or more residuals of buy orders or sell orders, if any, for one or more tradeable assets, which residual was not matched. According to one embodiment, the one or more electronic communications are initiated either automatically or after receipt of an electronic communication from an originator of the respective buy order or sell order.

Concerning step 320 described above, according to one embodiment where the system is configured to receive and process buy and/or sell orders having a data structure in accordance with the FIX protocol, the LockedQty parameter in the FIX protocol is used by a computer implemented component (e.g., a server) of the MES 100 system to provide substantially real-time status updates to buyer clients 120 and/or seller clients 130 concerning the quantity of their respective order that is locked-in. According to one embodiment, the computer implemented component "pushes" the status update to the buyer clients 120 and/or seller clients 130 using the FIX protocol. The meaning of "substantially real-time" has been discussed above. Push (or "server-push") is the delivery of information via the Web or other network that is initiated by the information server rather than by the information user client. Accordingly, in a push environment, the buyer client 120 and seller client 130 subscribe to a status update information feed provided by a component of the MES 100. According to one embodiment, several push technologies may be implemented including email, synchronous conferencing and instant messaging, to name a few.

According to a further embodiment, the system 100 is configured with a computer implemented method to receive additional buy orders and sell orders after the close price is published; match, in whole or in part, the additional respective buy orders to respective sell orders; and send one or more electronic communications to cause execution of the quantity match at the close price.

As noted above, transactions involving the transfer of securities between various entities in one embodiment may be performed electronically via one or more clearing systems, using suitable messaging formats and systems. In step 330, the sending of the one or more electronic communications cause the clearing system to execute the quantity match. For example, the DTC (Depository Trust Company) is one such clearing organization and provides a participant terminal system for transferring securities using electronic messaging. Thus, an electronic transfer of securities may be performed by sending an electronic message to the DTC. The DTC then performs a book entry movement by executing an accounting entry to move securities from one account to another account. Accordingly, a transfer of shares from a seller to a buyer may be accomplished by sending an electronic message to the DTC with instructions to transfer the shares from an account of the seller at the DTC to an account of the buyer at the DTC. Various other international clearing organizations in various cities (e.g., London, Tokyo) may be used to expedite the quantity match orders.

EXAMPLE

With reference to the timeline in FIG. 5 and the FIX protocol described above, one exemplary embodiment of the market-on-close system market-on-close and Trading At Last protocols is given below.

Order Protocol for Market On Close

Order Entry

Market On Close (MOC) orders are entered as standard New Order—Single messages with the following restrictions:

must set OrdType (40) to 5 (market on close) or OrdType (40) to 1 (market) and ExecInst (18) to c;

must set TimeInForce (59) to either 0 (Day) or 1 (Good Till Cancel) or 3 (Immediate Or Cancel) or 6 (Good Till Date) or 8 (Good Through Crossing);

Price (44) must not be set; (with a price set in the order, the order looks like a trading at last (TAL) order rather than an MOC order, and is therefore rejected. No price limits are allowed in MOC.)

may optionally set ExpireTime (126) to force publication of an Order Restatement at the specified time. Valid when TimeInForce (59) is 6 (Good Till Date).

Orders are implicitly hidden but do not need to be Large In Scale (LIS). MOC orders only interact with other MOC orders. Quotes are not represented on any given index market data feed. Matches are represented as trades on the given index's market data feeds.

Orders may be submitted until the official closing price is published by the primary market. However orders with a TimeInForce (59) of 3 (Immediate Or Cancel) can only be submitted during the Cross period.

Orders are matched in time priority at the official closing price only.

A single order may receive multiple fill orders dependant on its quantity and the number of orders matched against it.

Due to the random end of the Cross period, participants not wishing to take part in the Trading At Last period should set the TimeInForce (59) on their order to 8 (Good Through Crossing).

Order Cancellation (Returning Residuals)

An Order Cancel Request can be sent at any time during the Call period represented by circle 1 in FIG. 5. The standard FIX protocol applies.

During the Cross period of circle 1, an Order Cancel Request can be used to return the unmatched residual back to the client, thus allowing the client access to the primary auction.

In FIX, an Order Cancel Request sent during the Cross period has two possible outcomes:

1. A locked order will receive an Order Restatement specifying the locked quantity followed by an Order Cancel Reject with a CxlRejectReason (102)=0 (Too late to cancel); or 2. An unmatched order will be cancelled.

An alternative, which automates the above process, is to explicitly set the ExpireTime (126) on a New Order Single message.

Order Cancel/Replace (a.k.a. Order Modification)

Only the OrderQty (38) field can be changed in an order cancel/replace request.

An Order Cancel/Replace can be sent at any time during the Call period. The standard FIX protocol applies.

During the Cross period of circle 1, an Order Cancel/Replace to modify the order quantity has three possible outcomes:
1. An increase is allowed. Any locked quantity will be transferred to the new order but the residual will lose time priority;
2. A decrease above or equal to the locked quantity is allowed and the order will be modified in place, any residual will not lose time priority;
3. A decrease below the locked quantity will force an Order Restatement specifying the locked quantity followed by an Order Cancel Reject with a CxlRejectReason (102) =0 (Too late to cancel).

Order Restatement

An Order Restatement is a standard Execution Report (MsgType=8) with the following fields set:
ExecType (150) is D (Restated).
OrderQty (38) is the number of shares for the order. This may be less than the original order quantity if this restatement has been sent in response to an order expiry or cancellation/modification request.
LockedQty (7770) is the orders locked (matched) quantity. The difference between the OrderQty and the LockedQty represents the residual size still eligible for matching.
ExecRestatementReason (378) is 5 (Partial decline of OrderQty).
Text (58) is "A: locked N shares", where N is the locked quantity.

It is used by the system to communicate the matched quantity on a Market On Close order in response to a lock adjustment, cancellation/modification request or order expiry. It is a guarantee of a fill in the future at the given size but at an as yet unknown price.

Uncrossing

Once the primary's uncrossing price is known, fills are sent as standard Execution Report's for the locked quantity at the official closing price.

Order Protocol Embodiment for Trading At Last

Order Entry

Trading At Last (TAL) orders are entered as standard New Order—Single messages with the following restrictions:
must set OrdType (40) to 5 (market on close) or B (limit on close) or OrdType (40) to 1 (market) or 2 (limit) and ExecInst (18) to c;
must set TimeInForce (59) to either 0 (Day) or 1 (Good Till Cancel) or 3 (Immediate Or Cancel) or 6 (Good Till Date) or 8 (Good Through Crossing);
may optionally set Price (44). Valid when OrdType (40) is B (limit on close);
may optionally set ExpireTime (126). Valid when TimeInForce (59) is 6 (Good Till Date).

Orders are implicitly hidden but do not need to be Large In Scale (LIS). TAL orders only interact with other TAL orders. Quotes are not represented on any BATS market data feed. Matches are represented as trades on the BATS' market data feeds.

Orders are matched in time priority at the official closing price only. The Price (44) field can be used to provide price protection however limit buys below and sells above the official close will be rejected immediately without resting on the book.

A single order may receive multiple fills dependant on the number of orders matched against it.

After the Cross period (circle 1 in FIG. 5), residuals on the imbalance side of the book may be moved automatically into the Trading At Last period unless cancelled by the participant via an explicit Order Cancel Request or ExpireTime (126), or the TimeInForce (59) is 8 (Good Through Crossing).

Order Cancellation

An order cancellation can be sent at any time during the Trading At Last period. The standard FIX protocol applies.

Order Cancel/Replace

An order cancel/replace can be sent at any time during the Trading At Last period. The restrictions on Order Entry still apply (see above).

Order Restatements

Order Restatements are not used during Trading At Last, orders can be cancelled at any time.

Order Fills

Fills are sent as standard Execution Report's as soon as they are matched. The LastPx will always be the official closing price.

Order Expiry

At the end of the Trading At Last period all unmatched residuals will be returned to the participants with an unsolicited cancel.

Accordingly, in some embodiments the market-on-close operation and system manages risk and offers anonymity and savings on buy and sell orders at and after the close of a primary market auction. In some embodiments, the market-on-close operation is significantly less expensive than executing in a primary market's primary auction.

Order State Change Matrices

The matrices in appendix A are included to clarify the sequence of messages and the status of orders involved in Market On Close and Trading At Last:
A1—Fully filled Market On Close order;
A2—Part-filled Market On Close order with early expiry;
A3a—Cancel request for a fully locked Market On Close order—order restated and cancel rejected;
A3b—Cancel request for a partially locked Market On Close order—order restated and cancel rejected;
A3c—Cancel request for an unmatched Market On Close order—order cancelled;
A4—Cancel request for a partially locked order—order is restated and cancel rejected. Followed by a cancel/replace request to increase the quantity;
A5—Part filled Market On Close only order;
A6—Part filled Market On Close order, fully filled in trading at last;
A7—Part filled trading at last order;
A8—Non marketable trading at last LOC order.

Figure 2:
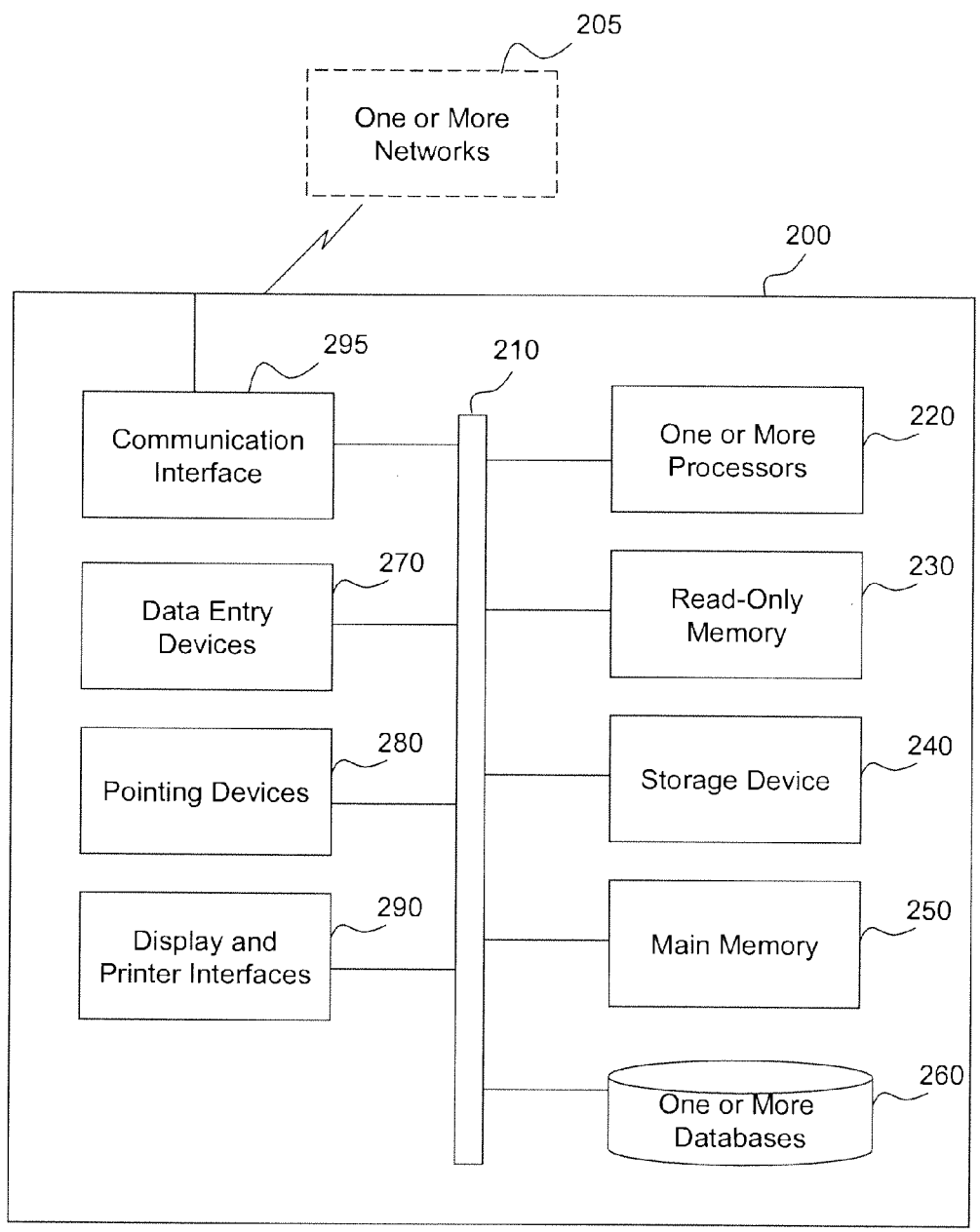
FIG. 2 is a schematic block diagram of an electronic system for implementing one or more embodiments.

FIG. 2 is a block diagram showing an embodiment of an MES 100 of FIG. 1, generally designated by reference number 200, according to an exemplary embodiment of the present invention. In one embodiment, the MES 200 according to the present invention may be communicatively coupled to one or more electronic networks 205, such as the Internet, to therethrough communicate information to interested or authorized parties. The MES 200 may also or alternatively be communicatively coupled to an electronic network 205 comprising a closed network (e.g., an intranet), and thereby communicate information to a limited number of receivers, potentially with an enhanced level of security. The MES 200 may be configured to communicate, via the one or more electronic networks 205, with respective computer systems (e.g., the systems of database 110, clients 120 and 130, and the primary market 140).

A communication interface 295 may provide data communication through one or more electronic networks 205 to the data devices of the other systems. The electronic network 205 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the electronic network 205 may be implemented accordingly. The electronic network 205 serves the purpose of delivering information between connected parties.

The MES 200 may be used in some embodiments to implement a computing platform for providing computer-implemented operations, for example, via a server and the one or more electronic networks 205. An exemplary MES 200 may operate under the control of computer-executable instructions (computer software) to carry out the process steps described herein. Computer-executable instructions comprise, for example, instructions and data which cause a general or special purpose computer system or processing device to perform a certain function or group of functions. Computer software for the MES 200 may comprise, in an embodiment, a set of software objects and/or program elements including computer-executable instructions collectively having the ability to execute in a single processor, or independently in a plurality of processors a thread or logical chain of process evaluation, and permit the flow of data inputs/outputs therebetween.

The MES 200 may be implemented as, or include, one or more personal computers, workstations, notebook computers, servers, mobile computing devices, handheld devices, multi-processor systems, networked personal computers, minicomputers, mainframe computers, personal data assistants, Internet appliances (e.g., a computer designed to connect to a network, especially the Internet, etc.), or controllers.

The MES 200 may comprise, in one embodiment, a bus 210 or other communication component that couples the various system elements 220-295, and may be configured to communicate information between the various system elements 220-295.

As shown in FIG. 2, one or more computers processors 220 may be configured to process and handle information and execute instructions, and may be coupled with the bus 210. The management system 200 also may include a main memory 250, such as a Random Access Memory (RAM) or other dynamic storage device, coupled to the bus 210 for storing information and instructions to be executed by the one or more processors 220. The main memory 250 also may be used for storing temporary variables or other intermediate information during execution of instructions by the one or more processors 220.

The management system 200 further may include a Read-Only Memory (ROM) 230 or other static storage device (e.g., EPROM, EAROM, EEPROM, PROM, flash, and the like) coupled to the bus 210 for storing static information and instructions for the one or more processors 220. Furthermore, a storage device 240, such as a magnetic disk or optical disk, such as a CD-ROM or other optical media may be provided and coupled to the bus 210 for storing information and instructions.

In addition to the ROM 230, one or more databases 260 (represented in FIG. 1 as database 110) may be coupled to the bus 210 for storing static information and software instructions. Information stored in or maintained using the database 260 may be provided in conformance with a database management system format such as, but not limited to, the Structured Query Language (SQL) format. Database query and access instructions, for example, in the form of one or more scripts, may be used which, when executed by a processor such as the processor 220, serve to store and retrieve data maintained in the database 260 according to the instructions contained in the script and the data fields to be accessed, as well as their arrangement.

Furthermore, the MES 200 may comprise application software instructions which may comprise a user interface portion for generating interactive pages or display screens by which a user may provide data to and receive information from the management system 200 and the database 260 using a human-machine interface such as a graphical user interface (GUI). Interactive pages may include user dialog boxes for accepting user entered information. In particular, the (GUI) portion may prompt the user to enter data by providing an interactive dialog box or message box instructing the user to enter particular data, or to select from among a multitude of options provided using a pull-down menu. A user may interact with the MES 200 via the graphical user interface provided by the GUI portion by using a pointing device and/or other data entry device. The GUI portion may place the output of the MES 200 in a format for presentation to a user via a display 290, discussed below. In at least one embodiment, the GUI may be implemented as a sequence of programming language instructions.

A data entry device 270, including alphanumeric and other keys, or a pointing device such as a mouse or trackball, or a scanner, to name a few, may be coupled to the bus 210 for communicating information and command selections to the processor 220. The data entry device 270 may be coupled to the bus 210 via an interface (not shown), wherein the interface may be, for example, a serial port, a RS-232 port, or the like. In addition, the interface may be a wireless interface and provide connection-less communication via, for example, Bluetooth communication.

The MES 200 may be coupled via the bus 210 to a display or printer 290 for outputting information to a computer user. In addition, a user may use the display (e.g., touch screen) or printer (e.g., scanner) to provide information to the management system 200. In one embodiment, the display 290 may be a Cathode Ray Tube (CRT) display, a Liquid Crystal Display (LCD), a plasma display, a LED display, a projector, or other suitable display, capable of displaying information. The printer may be a local or remote printer.

According to at least one embodiment of the present invention, the various program operations as described herein may be provided by the MES 200 in response to the one or more processors 220 executing one or more sequences of computer-readable instructions contained in the main memory 250. Such instructions may be read into the main memory 250 from another computer-readable medium, such as the ROM 230, the storage device 240, or the database 260. Execution of the sequences of instructions contained in the main memory 250 may cause the one or more processors 220 to perform the process steps described herein. It should be appreciated that an embodiment of the MES 200 may perform fewer or additional processes as compared to those described herein. As noted, the one or more processors 220 may be arranged in a multi-processing arrangement. Alternatively, hard-wired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any medium that is computer-readable and participates in providing instructions to the processor 220 for execution. Such a medium may be removable or non-removable and may take many forms, including, but not limited to, non-volatile media and volatile media. Non-volatile media include, for example, optical or magnetic disks, such as the storage device 240. Volatile media include dynamic memory, such as the main memory 250. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other tangible medium from which a computer can read computer instructions. Combinations of the above are also included within the scope of computer-readable media. Machine-executable instructions comprise, for example, instructions and data which cause a general purpose computer, special purpose computer, or special purpose processing machine to perform a certain function or group of functions. It should be appreciated that the one or more databases 260, the main memory 250, the storage device 240, and the ROM 230 may, in some embodiments, be described as a "computer-readable medium" or a "computer-readable storage medium."

The MES 200 also comprises a communication interface 295 coupled to the bus 210 and providing one-way, two-way or multi-way data communication with the electronic network 205, or directly with other devices. For example, the communication interface 295 may comprise a modem, a transceiver, an Integrated Services Digital Network (ISDN) card, a WAN card, an Ethernet interface, or the like, to provide a data communication connection to a corresponding type of communication medium. As another example, the communication interface 295 may comprise a LAN card to provide a data communication connection to a compatible LAN. Wireless links may also be implemented. In such wireless links, communication interface 295 may communicate with a base station communicatively coupled to a network server. In any such implementation, the communication interface 295 sends and receives electrical, electromagnetic, radio, infrared, laser, or optical signals that carry digital data streams representing various types of information. Any combination of the above interfaces may also be implemented.

In one embodiment, the communication interface 295 may provide a connection through a local network to a host computer or to data equipment operated by an Internet Service Provider (ISP). The ISP may in turn provide data communication services through a worldwide packet data communication network such as the Internet. These networks use electrical, electromagnetic, or optical signals that carry digital data streams.

In one embodiment, the communication interface 295 may be communicatively coupled to a web server configured to generate and output web content that is suitable for display using a web browser at a computing device. In an embodiment, the server may generate and transmit requested information through the communication interface 295 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals, and financial entity terminals, and third party database terminals, etc., access and process data from various sources, and output computer-executable instructions and data using the electronic network 205.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of the functions described in such steps.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice.

It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

| | | | | | A1 - Fully filled Market On Close order | | | | | |
|---|---|---|---|---|---|---|---|---|---|---|
| Time | Message Recv | Messge Sent | ExecType | OrdStatus | OrderQty | CumQty | LeavesQty | LastShares | LockedQty | Comment |
| 1 | New Order (X) | | | | 10000 | | | | | OrdType = 5 (MOC), TimeInForce = 1 (Good Till Cancel) |
| 2 | | Execution (X) | New | New | 10000 | 0 | 10000 | 0 | | |
| 3 | | Execution (X) | Restated | New | 10000 | 0 | 10000 | 0 | 2000 | Lock notification of 2000. Sent at the start of the Cross period. Guarantees a fill of 2000 shares at an as yet unknown price. The residual of 8000 is still eligible for further matching. |
| 4 | | Execution (X) | Restated | New | 10000 | 0 | 10000 | 0 | 3000 | Lock notification update, increase of 1000. The residual of 7000 is still eligible for further matching. |
| 5 | | Execution (X) | Restated | New | 10000 | 0 | 10000 | 0 | 10000 | Order for 7000 entered on the other side. Lock update notification, increase of 7000. Sent after the start of the Cross period. Order is now fully locked with no residual. |
| 6 | | Execution (X) | Partial Fill | Partially Filled | 10000 | 2000 | 8000 | 2000 | | Execution of 2000. Sent at the end of the Cross period, LastPx is the official closing price of the primary. |
| 7 | | Execution (X) | Partial Fill | Partially Filled | 10000 | 3000 | 7000 | 1000 | | Execution of 1000. Sent at the end of the Cross period, LastPx is the official closing price of the primary. |
| 8 | | Execution (X) | Fill | Filled | 10000 | 10000 | 0 | 7000 | | Execution of 7000. Sent at the end of the Cross period, LastPx is the official closing price of the primary. |

| | | | | | A2 - Part-filled Market On Close order with early expiry time | | | | | |
|---|---|---|---|---|---|---|---|---|---|---|
| Time | Message Recv | Messge Sent | ExecType | OrdStatus | OrderQty | CumQty | LeavesQty | LastShares | LockedQty | Comment |
| 1 | New Order (X) | | | | 10000 | | | | | OrdType = 5 (MOC), TimeInForce = 6 (GTD), ExpireTime = 16:33 |
| 2 | | Execution (X) | New | New | 10000 | 0 | 10000 | 0 | | |
| 3 | | Execution (X) | Restated | New | 10000 | 0 | 10000 | 0 | 9000 | Lock notification of 9000. Sent at the start of the Cross period. Guarantees a fill of 9000 shares at an as yet unknown price. The residual of 1000 is still eligible for further matching. |
| 4 | | Execution (X) | Restated | New | 9000 | 0 | 9000 | 0 | 9000 | Sent at 16:33, ExecRestatementReason = "Partial Decline of OrderQty", Text = "A: locked 9000 shares". Order is now fully locked with no residual. |
| 5 | | Execution (X) | Fill | Filled | 9000 | 9000 | 0 | 9000 | | Execution of 9000. Sent at the end of the Cross period, LastPx is the official closing price of the primary. |

| | | A3a - Cancel request for a fully locked Market On Close order - order restated and cancel rejected | | | | | | | | |
|---|---|---|---|---|---|---|---|---|---|---|
| Time | Message Recv | Messge Sent | ExecType | OrdStatus | OrderQty | CumQty | LeavesQty | LastShares | LockedQty | Comment |
| 1 | New Order (X) | | | | 10000 | | | | | OrdType = 5 (MOC), TimeInForce = 0 (Day) |
| 2 | | Execution (X) | New | New | 10000 | 0 | 10000 | 0 | | |
| 3 | | Execution (X) | Restated | New | 10000 | 0 | 10000 | 0 | 10000 | Lock notification of 10000. Sent at the start of the Cross period. Guarantees a fill of 10000 shares at an as yet unknown price. Order is now fully locked with no residual. |
| 4 | Cancel Request (Y, X) | | | | 10000 | | | | | Sent during Cross period |
| 5 | | Execution (X) | Restated | Pending Cancel | 10000 | 0 | 10000 | 0 | 10000 | Text = "A: locked 10000 shares". |
| 6 | | Cancel Reject (Y, X) | | Replaced | | | | | | Order is fully locked, cancellation is not allowed. CxlRejectReason = 0 (too late to cancel). Text = "J: locked in cross". |
| 7 | | Execution (X) | Fill | Filled | 10000 | 10000 | 0 | 10000 | | Execution of 10000. Sent at the end of the Cross period, LastPx is the official closing price of the primary. |

| | | A3b - Cancel request for a partially locked Market On Close order - order restated and cancel rejected | | | | | | | | |
|---|---|---|---|---|---|---|---|---|---|---|
| Time | Message Recv | Messge Sent | ExecType | OrdStatus | OrderQty | CumQty | LeavesQty | LastShares | LockedQty | Comment |
| 1 | New Order (X) | | | | 10000 | | | | | OrdType = 5 (MOC), TimeInForce = 0 (Day) |
| 2 | | Execution (X) | New | New | 10000 | 0 | 10000 | 0 | | |
| 3 | | Execution (X) | Restated | New | 10000 | 0 | 10000 | 0 | 8000 | Lock notification of 8000. Sent at the start of the Cross period. Guarantees a fill of 8000 shares at an as yet unknown price. The residual of 2000 is still eligible for further matching. |
| 4 | Cancel Request (Y, X) | | | | 10000 | | | | | Sent during Cross period |
| 5 | | Execution (X) | Restated | Pending Cancel | 8000 | 0 | 8000 | 0 | 8000 | ExecRestatementReason = "Partial Decline of OrderQty", Text = "A: locked 8000 shares". Order is now fully locked with no residual. |
| 6 | | Cancel Reject (Y, X) | | Replaced | | | | | | Order is locked, cancellation is not allowed. CxlRejectReason = 0 (too late to cancel). Text = "J: locked in cross". |
| 7 | | Execution (X) | Fill | Filled | 8000 | 8000 | 0 | 8000 | | Execution of 8000. Sent at the end of the Cross period, LastPx is the official closing price of the primary. |

| | | | | A3c - Cancel request for an unmatched Market On Close order - order cancelled | | | | | |
|---|---|---|---|---|---|---|---|---|---|---|
| Time | Message Recv | Messge Sent | ExecType | OrdStatus | OrderQty | CumQty | LeavesQty | LastShares | LockedQty | Comment |
| 1 | New Order (X) | | | | 10000 | | | | | OrdType = 5 (MOC), TimeInForce = 0 (Day) |
| 2 | | Execution (X) | New | New | 10000 | 0 | 10000 | 0 | | |
| 3 | Cancel Request (Y, X) | | | | 10000 | | | | | Sent during Cross period |
| 4 | | Execution (X) | Cancelled | Cancelled | 10000 | 0 | 0 | 0 | | Order is unmatched and not locked, cancellation is allowed |

| | | | | A4 - Cancel request for a partially locked order - order is restated and cancel rejected. Followed by a cancel/replace request to increase the quantity | | | | | |
|---|---|---|---|---|---|---|---|---|---|---|
| Time | Message Recv | Messge Sent | ExecType | OrdStatus | OrderQty | CumQty | LeavesQty | LastShares | LockedQty | Comment |
| 1 | New Order (X) | | | | 10000 | | | | | OrdType = 5 (MOC), TimeInForce = 0 (Day) |
| 2 | | Execution (X) | New | New | 10000 | 0 | 10000 | 0 | | |
| 3 | | Execution (X) | Restated | New | 10000 | 0 | 10000 | 0 | 6000 | Lock notification of 6000. Sent at the start of the Cross period. Guarantees a fill of 6000 shares at an as yet unknown price. The residual of 4000 is still eligible for further matching. |
| 4 | Cancel Request (Y, X) | | | | 10000 | | | | | Sent during Cross period |
| 5 | | Execution (X) | Restated | Pending Cancel | 6000 | 0 | 6000 | 0 | 6000 | ExecRestatementReason = "Partial Decline of OrderQty", Text = "A: locked 6000 shares". Order is now fully locked with no residual. |
| 6 | | Cancel Reject (Y, X) | | Replaced | | | | | | Order is locked, cancellation is not allowed. CxlRejectReason = 0 (too late to cancel). Text = "J: locked in cross". |
| 7 | Replace Request (Z, X) | | | | 8000 | | | | | Sent during Cross period. Request to increase quantity to 8000 is allowed. |
| 8 | | Execution (Z) | Replace | Replaced | 8000 | 0 | 8000 | 0 | 6000 | Guaranteed locked quantity of 6000 is transferred to this order. Residual of 2000 now available for further crossing but time priority is lost. |
| 9 | | Execution (Z) | Restated | Replaced | 8000 | 0 | 8000 | 0 | 7000 | Order for 1000 entered on the other side. Lock update notification, increase of 1000. Residual is now 1000. |
| 10 | | Execution (Z) | Partial Fill | Partially Filled | 8000 | 6000 | 2000 | 6000 | | Execution of 6000. Sent at the end of the Cross period, LastPx is the official closing price of the primary. |
| 11 | | Execution (Z) | Partial Fill | Partially Filled | 8000 | 7000 | 1000 | 1000 | | Execution of 1000. Sent at the end of the Cross period, LastPx is the official closing price of the primary. Residual of 1000 moves into Trading At Last period. |

A5 - Part filled Market On Close only order

| Time | Message Recv | Messge Sent | ExecType | OrdStatus | OrderQty | CumQty | LeavesQty | LastShares | LockedQty | Comment |
|---|---|---|---|---|---|---|---|---|---|---|
| 1 | New Order (X) | | | | 10000 | | | | | OrdType = 5 (MOC), TimeInForce = 8 (Good Through Crossing) |
| 2 | | Execution (X) | New | New | 10000 | 0 | 10000 | 0 | | |
| 3 | | Execution (X) | Restated | New | 10000 | 0 | 10000 | 0 | 2000 | Lock notification of 2000. Sent at the start of the Cross period. Guarantees a fill of 2000 shares at an as yet unknown price. The residual of 8000 is still eligible for further matching. |
| 4 | | Execution (X) | Restated | New | 10000 | 0 | 10000 | 0 | 3000 | Lock notification update, increase of 1000. The residual of 7000 is still eligible for further matching. |
| 5 | | Execution (X) | Partial Fill | Partially Filled | 10000 | 2000 | 8000 | 2000 | | Execution of 2000. Sent at the end of the Cross period, LastPx is the official closing price of the primary. |
| 6 | | Execution (X) | Partial Fill | Partially Filled | 10000 | 3000 | 7000 | 1000 | | Execution of 1000. Sent at the end of the Cross period, LastPx is the official closing price of the primary. |
| 7 | | Execution (X) | Cancelled | Cancelled | 10000 | 3000 | 0 | 0 | | Unsolicited cancellation sent at the end of the Cross period. Text = "X: Expired". |

A6 - Part filled Market On Close order, fully filled in trading at last

| Time | Message Recv | Messge Sent | ExecType | OrdStatus | OrderQty | CumQty | LeavesQty | LastShares | LockedQty | Comment |
|---|---|---|---|---|---|---|---|---|---|---|
| 1 | New Order (X) | | | | 10000 | | | | | OrdType = 5 (MOC), TimeInForce = 1 (Good Till Cancel) |
| 2 | | Execution (X) | New | New | 10000 | 0 | 10000 | 0 | | |
| 3 | | Execution (X) | Restated | New | 10000 | 0 | 10000 | 0 | 3000 | Lock notification of 3000. Sent at the start of the Cross period. Guarantees a fill of 3000 shares at an as yet unknown price. The residual of 7000 is still eligible for further matching. |
| 4 | | Execution (X) | Partial Fill | Partially Filled | 10000 | 3000 | 7000 | 3000 | | Execution of 3000. Sent at the end of the Cross period, LastPx is the official closing price of the primary. The residual of 7000 is automatically rolled into Trading At Last. |
| 5 | | Execution (X) | Partial Fill | Partially Filled | 10000 | 6000 | 4000 | 3000 | | Execution of 3000 in trading at last. LastPx is the official closing price of the primary. |
| 6 | | Execution (X) | Fill | Filled | 10000 | 10000 | 0 | 4000 | | Execution of 4000 in trading at last. LastPx is the official closing price of the primary. |

A8 - Non marketable trading at last LOC order

| Time | Message Recv | Messge Sent | ExecType | OrdStatus | OrderQty | CumQty | LeavesQty | LastShares | Comment |
|---|---|---|---|---|---|---|---|---|---|
| 1 | New Order (X) | | | | 10000 | | | | OrdType = B (LOC), TimeInForce = 1 (Good Till Cancel), Price outside the official closing price of |

A8 - Non marketable trading at last LOC order

| Time | Message Recv | Messge Sent | ExecType | OrdStatus | OrderQty | CumQty | LeavesQty | LastShares | Comment |
|---|---|---|---|---|---|---|---|---|---|
| 2 | | Execution (X) | New | New | 10000 | 0 | 10000 | 0 | the primary, sent during Trading At Last |
| 3 | | Execution (X) | Rejected | Rejected | 10000 | 0 | 0 | 0 | Rejection, price is outside the official closing price. Text = "A: Price is greater than official close" |

A7 - Part filled trading at last order

| Time | Message Recv | Messge Sent | ExecType | OrdStatus | OrderQty | CumQty | LeavesQty | LastShares | Comment |
|---|---|---|---|---|---|---|---|---|---|
| 1 | New Order (X) | | | | 10000 | | | | OrdType = 5 (MOC), TimeInForce = 1 (Good Till Cancel), sent during Trading At Last |
| 2 | | Execution (X) | New | New | 10000 | 0 | 10000 | 0 | |
| 3 | | Execution (X) | Partial Fill | Partially Filled | 10000 | 2000 | 8000 | 2000 | Execution of 2000 in trading at last. LastPx is the official closing price of the primary. |
| 4 | | Execution (X) | Cancelled | Cancelled | 10000 | 2000 | 0 | 0 | Unsolicited cancellation sent at the end of the Trading At Last period. Text "X: Expired". |

What is claimed is:

1. A system for providing a market on-close (MOC) operation for a secondary market for tradeable assets listed on a given primary listing market, comprising:

one or more computers of the secondary market, configured with the following components:

an electronic network communication component for transmitting and receiving electronic communications over one or more electronic networks;

a component, configured in the one or more computers of the secondary market, to receive by the one or more computers of the secondary market buy orders and sell orders for tradeable assets listed for auction on the given primary listing market to be bought or sold on the secondary market only at an official close price from the primary listing market for the tradeable asset, with each of a plurality of the orders including a quantity parameter, but not a required price, and including an MOC order indicator;

a component configured in the one or more computers of the secondary market to match, in whole or in part, a respective MOC buy order to a respective MOC sell order or vice versa for a given one of the tradeable assets to obtain a respective partial or whole quantity match of the order only at an official close price obtained for the given primary listing market for the given tradeable asset;

a component configured in the one or more computers of the secondary market to obtain via the electronic network communication component the official close price for the given tradeable asset in the given primary listing market;

a component configured in the one or more computers of the secondary market to generate one or more electronic signals to cause execution of the quantity match of the order in the secondary market at the official close price from the primary listing market after receiving the official close price from the primary listing market for the given tradeable asset;

a component configured in the one or more computers of the secondary market to transmit or post via the electronic network communication component a partial or whole fill message of their respective orders to the respective buyer and the respective seller with the quantity matched and the official close price from the primary listing market for the tradeable asset; and a component configured in the one or more computers of the secondary market to access an electronic database, configured to store the received buy orders and sell orders for the tradeable assets.

2. The system of claim 1, further comprising the one or more computers of the secondary market configured to operate to only match orders that each include an MOC order indicator.

3. The system of claim 1, further comprising the one or more computers of the secondary market configured to operate during a market on close (MOC) period, to only match orders that do not include data indicating a share price requirement.

4. The system of claim 1, further comprising the one or more computers of the secondary market configured to operate during a market on close (MOC) period, to accept into the system only orders that each include an MOC order indicator.

5. The system of claim 1, further comprising the one or more computers of the secondary market configured for a market on close (MOC) period, to remove from the system at a close all orders without an MOC order indicator.

6. The system of claim 1, wherein the receiving component is configured to receive by the one or more computers of the secondary market buy orders with an MOC order indicator and sell orders with an MOC order indicator throughout a trading period before the market close of the given primary listing market, but these orders are not matched by the secondary market until a market on close (MOC) period in the secondary market.

7. The system of claim 1, further comprising a component configured in the one or more computers of the secondary market to send one or more electronic return communications to return one or more residuals of respective buy orders or sell orders, for one or more tradeable assets, when one or more of the buy orders or sell orders were not matched in whole or in part by the component for matching.

8. The system of claim 7, wherein the component for sending one or more electronic return communications to return one or more residuals from a respective one of the buy orders or sell orders is configured to initiate one or more of the electronic return communications either automatically or after receipt of an electronic communication from an originator of the respective buy order or sell order.

9. The system of claim 1, wherein the component for matching is configured to match buy orders and sell orders in a time priority.

10. The system of claim 1, wherein the component to send one or more electronic communications to cause execution of the sale of the quantity match of the order is configured to send the one or more electronic communications after the official close price from the primary listing market is published.

11. The system of claim 1, wherein the system is further configured with one or more components:
to receive additional buy orders and sell orders in the secondary market after the official close price from the primary listing market is published;
to match, in whole or in part, by the one or more computers of the secondary market, one respective buy order to one respective sell order to obtain a respective partial or whole quantity match of the order, wherein at least one of the buy order and the sell order is an additional order; and
to send one or more electronic communications to cause execution of the quantity match of the order associated with the at least one additional order at the official close price from the primary listing market.

12. The system of claim 1, further comprising a component configured in the one or more computers of the secondary market to modify or cancel one of the buy orders or one of the sell orders based on an electronic communication received before a respective partial or whole quantity match of the order for that respective buy order or respective sell order is locked in.

13. The system of claim 1,
wherein one or more of the received buy orders or sell orders comprise a data structure that comprises a parameter specifying a length of time the respective buy order or respective sell order is in force and can be matched, and
wherein the component to match is configured to match only buy orders and sell orders where neither order has a length of time parameter, if specified, that has lapsed.

14. The system of claim 1, further comprising a component configured in the one or more computers of the secondary market to transmit or post via the electronic network communication component a message to the respective buyer and to the respective seller that all or part of the respective order has been matched and is locked-in.

15. The system of claim 14, wherein the transmission of the message of the quantity is triggered by a change in a locked-in quantity indicator in a data structure for the respective buy or sell order.

16. The system of claim 15,
wherein the component to receive is configured to receive buy orders and sell orders for tradeable assets listed on at least one additional primary listing market, and
wherein the component to match is configured to only match buy orders to sell orders listed on a same one of the primary listing markets.

17. The system of claim 14, wherein the component to transmit or post via a message to the respective buyer and to the respective seller that part or all of their respective order has been matched and is locked-in is configured to only trigger the transmitting or posting when a communication is received from the respective buyer or the respective seller requesting to modify or cancel their respective order.

18. The system of claim 14, wherein the component to transmit or post via a message to the respective buyer and to the respective seller that part or all of their respective order has been matched and is locked-in is configured to trigger the transmitting or posting of the message as soon as the lock-in occurs.

19. The system of claim 1, wherein the quantity match of the order in the secondary market is not published and is maintained confidential.

20. The system of claim 1, wherein the buy orders and sell orders in the secondary market for tradeable assets listed on the given primary listing market and the quantity match of the orders are not published and are maintained confidential.

21. The system as defined in claim 1, further comprising:
a component configured in the one or more computer of the secondary market, to lock-in, before the official close price for the given tradeable asset is obtained, the respective quantity match of the order without a price for the given tradeable asset, so that the respective buyer or seller cannot cancel a portion of their respective order that comprises the quantity match of the order after this lock-in; and
a component configured in the one or more computers of the secondary market to transmit or post via the electronic network communication component a message to the respective buyer or to the respective seller, or to the respective buyer and the respective seller, that part or all of their respective order has been matched and is locked-in.

22. A method for providing a market on-close operation for a secondary market for tradeable assets listed on a given primary listing market, comprising:
receiving, by the one or more computers of the secondary market, buy orders and sell orders for tradeable assets listed for auction on the given primary listing market to be bought or sold on the secondary market only at an official close price from the primary listing market for the tradeable asset, with each of a plurality of the orders including a quantity parameter, but not a required price, and including a MOC order indicator;
matching, by the one or more computers of the secondary market, in whole or in part, a respective MOC buy order to a respective MOC sell order or vice versa for a given one of the tradeable assets to obtain a respective partial or whole quantity match of the order only at an official close price obtained for the given primary listing market for the given tradeable asset;
obtaining, via the one or more electronic networks, the official close price for the tradeable asset in the given primary listing market;
generating, by the one or more computers of the secondary market, one or more electronic signals causing execution of the quantity match of the order in the secondary market at the official close price from the primary listing market after receiving the official close price for the given tradeable asset; and transmitting or posting via the one or more electronic networks and the one or more computers of the secondary market, a partial or whole fill message of their respective orders to the respective buyer and the respective seller with the quantity matched and the official close price from the primary listing market for the tradeable asset.

23. The method of claim 22, further comprising matching, by the one or more computers of the secondary market only orders that each include an MOC order indicator.

24. The method of claim 22, further comprising matching, by the one or more computers of the secondary market only orders that do not include data indicating a share price requirement.

25. The method of claim 22, further comprising accepting, by the one or more computers of the secondary market during a market on close (MOC) period, only orders that each include an MOC order indicator.

26. The method of claim 22, further comprising removing, by the one or more computers of the secondary market for a market on close (MOC) period all orders without an MOC order indicator.

27. The method of claim 22, accepting during a MOC period, by the one or more computers of the secondary market, only orders that do not include data indicating a share price requirement.

28. The method of claim 22, wherein the buy orders with an MOC order indicator and sell orders with an MOC order indicator are received by the secondary market throughout a primary listing market trading period before the market close of the given primary listing market, but are not matched in the secondary market until a market on close (MOC) period in the secondary market.

29. The method of claim 22, further comprising sending one or more electronic return communications to return one or more residuals of respective buy orders or sell orders, for one or more tradeable assets, when one or more of the buy orders or sell orders were not matched in whole or in part.

30. The method of claim 29, comprising initiating the one or more electronic return communications to return one or more of the residuals from a respective one of the buy orders or sell orders either automatically or after receipt of an electronic communication from an originator of the respective buy order or sell order.

31. The method of claim 22, wherein the matching step matches buy orders and sell orders in a time priority.

32. The method of claim 22, further comprising:
receiving additional buy orders and sell orders in the secondary market after the official close price from the primary listing market is published;
matching, in whole or in part, by the one or more computers of the secondary market, one respective buy order to one respective sell order to obtain a respective partial or whole quantity match of the order, wherein at least one of the buy order and the sell order is an additional order; and
sending, by the one or more computers of the secondary market, one or more electronic communications to cause execution of the quantity match of the order associated with the additional order at the official close price from the primary listing market.

33. The method of claim 22, further comprising modifying or cancelling one of the buy orders or one of the sell orders based on an electronic communication received before a respective partial or whole quantity match of the order for that respective buy order or respective sell order is locked in.

34. The method of claim 22, wherein one or more of the received buy orders and sell orders comprise a data structure that comprises a parameter specifying a length of time parameter the respective buy order or respective sell order is in force and can be matched, and wherein the matching step matches, by the one or more computers of the secondary market, only buy orders and sell orders where neither order has a length of time parameter, if specified, that has lapsed.

35. The method of claim 34, wherein the matching is configured to match buy orders and sell orders in a time priority.

36. The method of claim 34, further comprising:
receiving additional buy orders and sell orders after the official close price from the primary listing market is published;
matching, in whole or in part, by the one or more computers of the secondary market, a respective buy order to a respective sell order, wherein at least one of the buy order and the sell order is an additional order; and
sending one or more electronic communications to cause execution of the quantity match at the official close price from the primary listing market.

37. The method of claim 22, comprising executing, by the one or more computers of the secondary market, push software for transmitting a message concerning one selected from the group of a locked-in quantity for the respective buy order and the respective sell order and a locked-in quantity for the respective buy order or the respective sell order.

38. The method of claim 37, comprising triggering, by the one or more computers of the secondary market, transmission of the message of a locked-in quantity in response to a change in a locked-in quantity indicator in a data structure for one selected from the group of the respective buy order or the respective sell order and the respective buy order and the respective sell order.

39. The method of claim 22, wherein the quantity match of the order in the secondary market is not published and is maintained confidential.

40. The method of claim 22, wherein the buy orders and sell orders in the secondary market for tradeable assets listed on the given primary listing market and the quantity match of the order are not published and are maintained confidential.

41. The method of claim 22, wherein the receiving step comprises receiving buy orders and sell orders for tradeable assets listed on at least one additional primary listing market, and
wherein the matching step, by the one or more computers of the secondary market, matches only buy orders to sell orders listed on a same one of the primary listing markets.

42. The method as defined in claim 22, further comprising:
locking-in, by the one or more computer of the secondary market, before the official close price for the given tradeable asset is obtained, the respective quantity match of the order without a price for the given tradeable asset, so that the respective buyer or seller cannot cancel a portion of their respective order that comprises the quantity match of the order after this lock-in; and
transmitting or posting, via the one or more electronic networks and the one or more computers of the secondary market, a message to the respective buyer or the respective seller, or to the respective buyer and the respective seller, that part or all of their respective order has been matched and is locked-in, at least when one of the buyer or the seller attempts to modify or cancel their respective order.

43. A program product, comprising:

computer-readable non-transitory storage medium having computer-executable instructions embodied therein, to be executed by a computer, for performing a method comprising:

receiving, over one or more electronic networks and by one or more computers of a secondary market, buy orders and sell orders for tradeable assets listed for auction on a given primary listing market to be bought or sold on the secondary market only at an official close price from the primary listing market for the tradeable asset, with each of a plurality of the orders including a quantity parameter, but not a required price, and including an MOC order indicator;

matching, by the one or more computers of the secondary market, in whole or in part, a respective MOC buy order to a respective MOC sell order or vice versa for a given one of the tradeable assets to obtain a respective partial or whole quantity match of the order at the official close price obtained for the given primary listing market for the given tradeable asset;

obtaining, via the one or more electronic networks, the official close price for the tradeable asset on the given primary listing market;

generating, by the one or more computers of the secondary market, one or more electronic signals to cause execution of the quantity match of the order in the secondary market at the official close price from the primary listing market after receiving the official close price from the primary listing market for the given tradeable asset; and transmitting or posting via the one or more electronic networks and the one or more computers of the secondary market, a partial or whole fill message to the respective buyer and the respective seller with the quantity matched and the official close price from the primary listing market for the tradeable asset.

44. The program product as defined in claim 43, further comprising computer-executable instructions embodied in the non-transitory storage medium for performing, when executed, the steps:

locking-in, by the one or more computer of the secondary market, before the official close price for the given tradeable asset is obtained, the respective quantity match of the order without a price for the given tradeable asset, so that the respective buyer or seller cannot cancel a portion of their respective order that comprises the quantity match of the order after this lock-in; and transmitting or posting, via the one or more electronic networks and the one or more computers of the secondary market, a message to the respective buyer or the respective seller, or to the respective buyer and the respective seller, that part or all of their respective order has been matched and is locked-in, at least when one of the buyer or the seller attempts to modify or cancel their respective order.

* * * * *